(No Model.)
D. TUFTS.
VEHICLE BRAKE.
No. 342,482. Patented May 25, 1886.
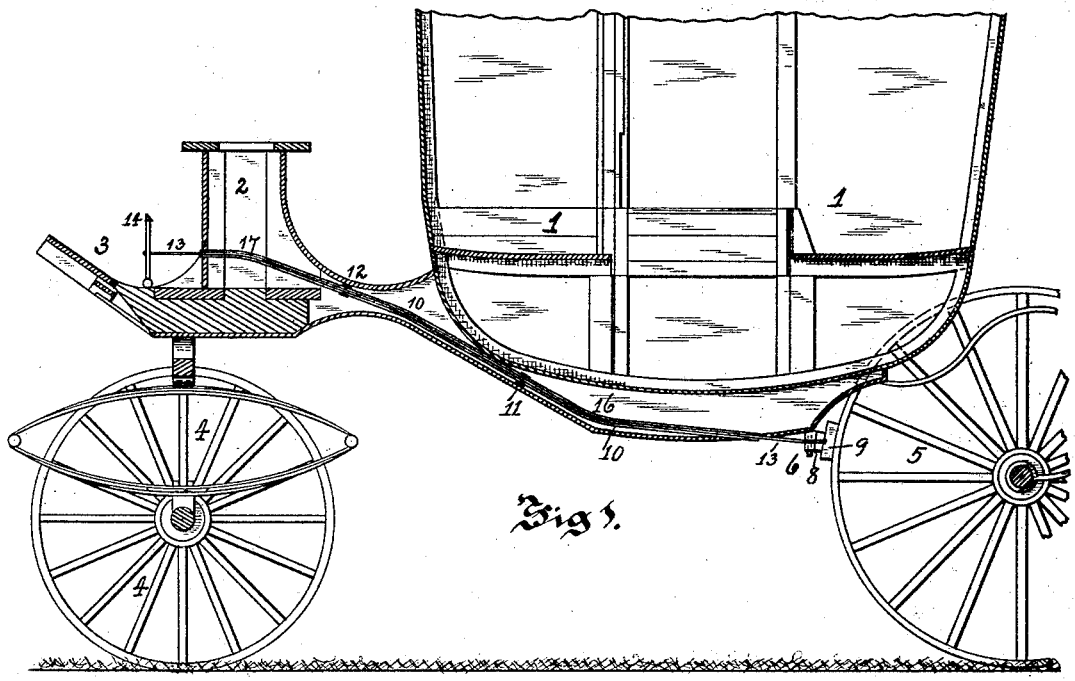
Fig. 1.
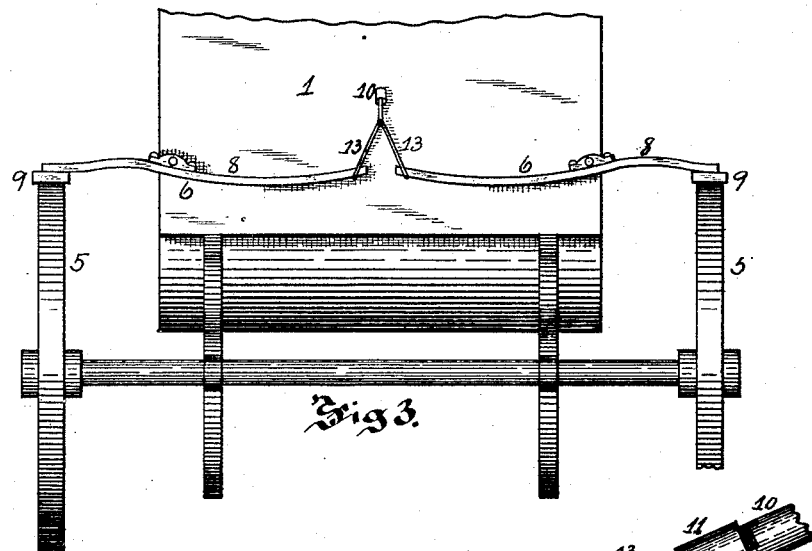
Fig. 3.
Fig. 2.
Witnesses:
J. N. Cooke
L. E. Barnes
Inventor.
David Tufts
By James F. Ray
Attorney

UNITED STATES PATENT OFFICE.

DAVID TUFTS, OF PITTSBURG, PENNSYLVANIA.

VEHICLE-BRAKE.

SPECIFICATION forming part of Letters Patent No. 342,482, dated May 25, 1886.

Application filed April 14, 1886. Serial No. 198,790. (No model.)

*To all whom it may concern:*

Be it known that I, DAVID TUFTS, of Pittsburg, in the county of Allegheny and State of Pennsylvania, have invented a new and useful Improvement in Vehicle-Brakes; and I do hereby declare the following to be a full, clear, and exact description thereof.

My invention relates to the brakes of carriages, wagons, and like vehicles, having special reference to the brakes employed in carriages, coupés, and like vehicles, to which, on account of the shape of the body of the vehicle, it has been found very difficult to apply a brake. As is well known to carriage and wagon manufacturers, these carriages are provided with a curved portion under the front seat or driver's seat thereof, into the space formed by which the carriage-wheel enters when the carriage is being turned, and as the carriage-wheels enter this space it is evident that no brake-rod can be arranged so as to extend across this space, and at the same time, in case the brake were so applied to a large number of such carriages the appearance of the carriage would be greatly marred by the brake-rods where they were exposed to view. The only means heretofore devised for applying brakes to these carriages having curved portions at the forward end has been to employ short rods connected by bell-levers, the rods being partly inclosed within the sheathing of the carriage-body, and the great difficulty experienced with any such brake apparatus has been that the bell-levers were necessarily of short movement, and it often occurred that the movement of the brake apparatus was not sufficient to apply the necessary pressure to the carriage-wheels, especially in view of the fact that these carriage-wheels are mounted on springs having large movement to give an easy motion to the carriage. For this reason brake apparatus in carriages has only been employed in isolated cases, though it is evident that such apparatus is extremely desirable, especially in hilly country and over country roads, as relieving the horses of very great strain, as well as adding greatly to safety of travel.

The object of my invention is to provide an efficient means of applying this brake apparatus to carriages, coupés, and like vehicles having the curved portion to permit the entrance of the forward wheels of the carriage in turning, as before referred to, though it may be employed to advantage in connection with any wagon or like vehicle; and to this end my invention consists in brake apparatus formed of a rope or chain connected to the power-lever at the driver's seat and braking apparatus and a tube extending through or under the body of the carriage or wagon, through which tube or pipe the rope or chain passes, and by which its movement in applying the breaking strain from the power-lever at the driver's seat to the breaking apparatus is directed.

It also consists in a covering of leather, rubber, or like material for the rope or chain, or a lining for the tube of similar material to prevent the rattling or noise of the same during the motions of the carriage or when the brake is applied.

It also consists in details of construction, as hereinafter specifically set forth.

To enable others skilled in the art to make and use my invention, I will describe the same more fully, referring to the accompanying drawings, in which—

Figure 1 is a longitudinal central section of a carriage-body, illustrating my invention. Fig. 2 is an enlarged view of a portion of the pipe and rope passing through the same, and Fig. 3 is a bottom view showing the connection between the rope and braking apparatus.

Like letters of reference indicate like parts in each.

The carriage-body 1 shown in the drawings is the ordinary four-seated carriage with raised driver's seat at the forward end above the wheels, the raised driver's seat 2, as well as his foot-rest 3, being raised to such a height that it is not necessary to employ a tube or pipe having short bends therein, as hereinafter referred to, for the reason that the driver's seat 2 is raised entirely above the forward wheels, 4.

The carriage is provided with the rear wheels, 5, connected by suitable springs to the carriage-body, and the braking apparatus is applied to these rear wheels, the braking apparatus 6 being supported in any suitable manner, either by the carriage-body or by the rear axle on which the rear wheels, 5, move. In the braking apparatus shown the brake-bars 8, carrying the brake-shoes 9, are supported by the carriage-body.

Extending through the carriage-body from the driver's seat 2 to any suitable place from which the rope or chain, hereinafter referred to, can be connected to the braking apparatus 6 is the pipe or tube 10, this tube being an ordinary wrought-metal tube, which is curved or bent in a shape corresponding to the curvature or shape of the body of the carriage through which it passes, it being of course preferable that this tube 10 should be inclosed in the body of the carriage, as shown in Fig. 1, though it may, of course, extend part way through the body and part way under the same, if desired.

The tube 10 is securely supported by any suitable means within or under the carriage-body, its forward end being secured at the driver's seat, as shown, and when it is formed in sections these sections being connected by any suitable joints, as at 11 or 12.

When it is applied to a carriage already made, the tube may be formed in two or more sections, and may be inserted from different parts of the carriage and connected by a suitable right and left hand threaded coupling, as at 11, it being thus made possible to apply the tube to any carriage, no matter what the shape of the body of the same may be, it only being necessary to remove the sheathing of the carriage at the point where the sections of the tube meet, and connect the tube by means of this joint and properly support the same at these points.

In the tube shown in Fig. 1 it would only be necessary to form the tube in two sections, and insert one from the forward end of the driver's seat and the other from the rear portion of the carriage-body, these two sections being joined by means of the coupling 11 at the forward end of the carriage-body, as shown. Where, however, the tube is secured in place during the building of the carriage a single tube may be employed, this tube being bent so as to conform to the shape of the body, as above described. Extending through this tube 10 is the rope or chain 13, a wire rope being preferably employed for the purpose, this rope being connected at the driver's seat to the power-lever 14, which extends up above the foot-rest in proper position for operation by the driver's foot, and being connected at the rear end of the carriage to the braking apparatus 6, as is usual in the ordinary wagon-brakes. It is therefore evident that as the driver pushes upon the power-lever 14 and draws the rope through the tube he draws upon the braking apparatus, and so applies the brakes to the wheels, and he can apply any desired force to the same, and can take up any slack caused by the spring of the wheels in passing over any rough part of the road, the power of the brake not being limited in any manner whatever, as is the case where short levers connected by bell-cranks are employed.

In order to prevent any rattling of the rope or chain within the tube, I prefer to incase the same in a flexible tube or cover formed of rubber or leather, as at 15, by means of which any scraping or friction of the rope or chain within the tube is prevented, and the sound caused by the movement of the same is deadened, a light rubber tube inclosing the rope or chain being suitable for the purpose. Instead of this covering for the rope or chain, the tube 10 may be lined by any suitable material which will have the same action. It is evident that in some cases it will only be necessary to employ short sections of tubing at the points where the rope or chain is necessarily bent or curved in passing through the carriage—such as at the points 16 and 17 in the carriage-body shown—and when such short sections of tubing are employed they are of course included within my invention.

Though not so necessary, my improved form of braking apparatus can be well applied to the ordinary wagon or other vehicle, the rope or chain passing through a tube under the body of the wagon and the brake being applied in such manner as to raise it out of the way of the wheels or wagon-frame, so that many advantages are obtained over the ordinary rigid bar heretofore employed for this purpose.

When my improved wagon or carriage brake is used, and the driver desires to apply the brake by pressing upon the foot or power lever 14, he draws the rope 13 forward through the tube 10, the rope being flexible, and as it is drawn through the tube conforming to the shape thereof, so that even in coupés and other vehicles where the body of the carriage is angular the power can be transmitted from the driver's seat to the brakes, even though there are short bends or angles in the body of the carriage, the tube extending through the body in such position as to be entirely concealed therein out of the way of both carriage wheels and doors or other parts of the carriage, where the ordinary straight or direct connection could not be made between the power-lever at the driver's seat and the braking apparatus at the rear wheels. As the rope or chain can be drawn forward through these curved tubes as far as necessary to apply the full braking force to the wheels, there is no limitation to the braking power applied to the carriage, the rope simply conforming in its movement to the tube through which it passes and the tube sustaining the strain in the curved or angular portions thereof, so that the entire force upon the foot-lever is applied to the brakes. At the same time all noise or creaking or rattling sound caused by the movement of the rope or chain within the tube is overcome by the covering of the rope or chain or lining of the tube. By this means I am enabled to obtain an efficient carriage-brake, no matter what may be the shape of the carriage-body, while the apparatus is simple in construction and is strong, and is not liable to get out of order, as the tube can be suitably supported within the carriage-body, and its curved or angular shape will assist in supporting it against strain where the rope or chain is drawn through the same.

What I claim as my invention, and desire to secure by Letters Patent, is—

1. In carriage or wagon brakes, a flexible rope or chain connected to the power-lever and braking apparatus and passing through a tube secured within or under the carriage or wagon body, substantially as and for the purposes set forth.

2. In carriage or wagon brakes, a flexible rope or chain connected to the power-lever and braking apparatus and passing through a curved or bent tube inclosed and concealed within the carriage or wagon body, substantially as and for the purposes set forth.

3. In carriage or wagon brakes, a tube formed in sections and connected within the carriage or wagon body by means of a right and left hand threaded coupling, in combination with a flexible rope or chain passing through the same and connected to the power-lever and braking apparatus, substantially as and for the purposes set forth.

4. In carriage or wagon brakes, a tube passing through or under the carriage or wagon body and a rope or chain passing through the same and connected to the power-lever and braking apparatus, said rope or chain having a leather or like cover, substantially as and for the purposes set forth.

In testimony whereof I, the said DAVID TUFTS, have hereunto set my hand.

DAVID TUFTS.

Witnesses:
JAMES I. KAY.
J. N. COOKE.